(12) United States Patent
Li

(10) Patent No.: US 6,650,025 B2
(45) Date of Patent: Nov. 18, 2003

(54) COMBINED VEHICLE WINDOW CONTROL AND CHILD SAFETY LOCKING DEVICE

(75) Inventor: Mark Hao Li, Birmingham (GB)

(73) Assignee: Meritor Light Vehicle Systems (UK) Limited (GB)

( * ) Notice: Subject to any disclaimer, the term of this patent is extended or adjusted under 35 U.S.C. 154(b) by 0 days.

(21) Appl. No.: 09/951,359

(22) Filed: Sep. 13, 2001

(65) Prior Publication Data
US 2003/0042793 A1 Mar. 6, 2003
(Under 37 CFR 1.47)

(30) Foreign Application Priority Data
Sep. 14, 2000 (GB) ............................................. 0022533

(51) Int. Cl.$^7$ .................................................... B60L 1/00
(52) U.S. Cl. ........................ 307/10.1; 180/271; 180/287
(58) Field of Search ................................ 292/201, 144, 292/336.3, DIG. 23, DIG. 65; 180/271, 287, 289; 70/237, 277, 278; 307/10.1, 9.1; 200/5 R; 318/4, 14, 15; 49/72

(56) References Cited

U.S. PATENT DOCUMENTS

| 4,450,390 A | * | 5/1984 | Andrei-Alexandru et al. ........................... 318/282 |
| 5,698,907 A | * | 12/1997 | Weber ........................ 307/10.1 |
| 6,420,799 B1 | * | 7/2002 | Sakamoto et al. ......... 307/10.1 |

FOREIGN PATENT DOCUMENTS

| DE | 3640796 A | 6/1988 |
| DE | 3724802 A | 2/1989 |
| JP | 101140899 A | 5/1998 |

* cited by examiner

Primary Examiner—Shawn Riley
(74) Attorney, Agent, or Firm—Carlson, Gaskey & Olds

(57) ABSTRACT

A vehicle incorporating a switch, a window operable by a first power actuator, and a door having a child safety locking device operable by a second power actuator, the vehicle further including an associated window operating switch and an inside door opening handle for normal use by an occupant sitting adjacent the door, in which the switch is arranged to operate the second power actuator to put the child safety locking device into a child safety on condition, prevent the first power actuator from opening the window in response to operation of the associated window operating switch, and prevent the second power actuator from operating in response to operation of the inside door opening handle.

14 Claims, 2 Drawing Sheets

COMBINED VEHICLE WINDOW CONTROL AND CHILD SAFETY LOCKING DEVICE

BACKGROUND OF THE INVENTION

The present invention relates to vehicles, in particular vehicles having power operated windows and doors with child safety locking devices.

Child safety locking devices are known on rear vehicle doors, and can be in either an on or off condition. The child safety locking device on condition corresponds to a situation which prevents the opening of the door by operation of an inside door handle, and the child safety device off condition corresponds to a situation which allows the opening of the door by operation of an inside door handle. Child safety locking devices can be manually changed between these conditions. Furthermore, vehicle manufacturers are employing power operated child safety locking devices operable by switches usually located near the driver.

Many vehicles incorporate a switch to disable the rear electric windows, with this switch again usually located near the driver. Clearly many other driver operated switches and levers need to be readily operable by the driver, hence there is limited space for these devices.

SUMMARY OF THE INVENTION

According to the present invention there is provided a vehicle incorporating a control switch, and a door having a window operable by a first actuator, and a child safety locking device operable by a second actuator, in which the switch is arranged so that it is capable of affecting the operation of the first actuator and also the operation of the second actuator.

Advantageously, this allows a single switch to operate two closely related safety functions.

Preferably, the switch maybe located near the driver to give the driver control over the operation of the switch.

BRIEF DESCRIPTION OF THE DRAWINGS

The invention will now be described, by way of example with reference to the accompanying drawings in which.

DETAILED DESCRIPTION OF THE PREFERRED EMBODIMENT

Figure 1:
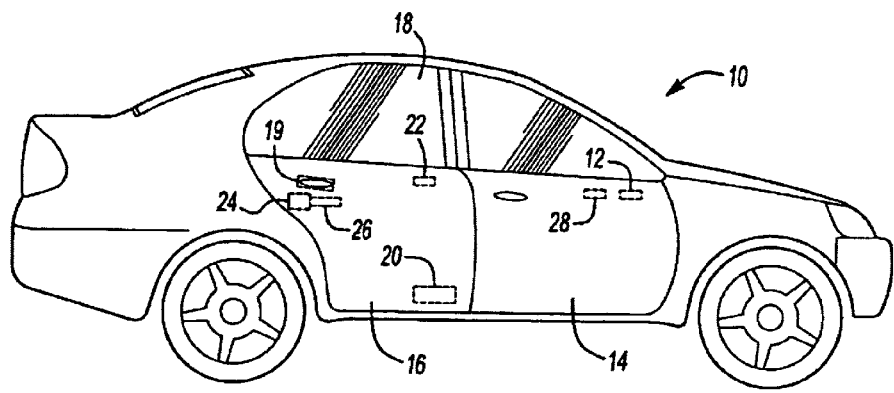
FIG. 1 is a view of a vehicle according to one embodiment of the present invention.

With reference to FIG. 1, a vehicle 10 comprises a control switch 12, a front drivers door 14, a rear door 16, a rear electric window 18, and a child safety locking device 24. The rear door 16 includes an inside door opening handle 19 operable to release the door. The switch 12 is located on the front drivers door 14. The rear electric window 18 is lowered and raised by a first actuator 20, the first actuator 20 being operable by an associated window operating switch in the form of a rear electric window switch 22.

Both the rear electric window switch 22 and the inside door opening handle 19 are located on the rear door such that they can both be operated by an occupant sitting adjacent the rear door 16. Alternatively, the rear electric window switch can be located on, for example, a drivers seat back, a roof lining, or another location which is within reach of an occupant sitting adjacent the rear door.

The vehicle may include other electric window switches operable to raise or lower window 18, such as a dash board mounted switch. However, such a switch is designed to be operated by a front seat driver or passenger, and would not normally be expected to be used by a rear seated passenger (see in particular front mounted electric window switch 28 mentioned below). Similarly, the vehicle may contain other inside door opening handles operable to open the rear door 16 but again these would be located for operation by a front seat driver/passenger and would not normally be expected to be used by a rear seat passenger.

The child safety locking device 24 is activated by a second power actuator 26. The vehicle 10 further includes a front mounted electric window switch 28 which also operates the first power actuator 20. The second power actuator 26 acts to put the child safety locking device 24 into one of two conditions. The first condition corresponds to the child safety locking device 24 being in an on condition, in which it is not possible to open the rear door 16 using the inside door opening handle 19. Operation of the inside door opening handle does not result in the second power actuator operating, and thus the child safety locking device remains in the on condition. The second condition corresponds to the child safety locking device 24 being in an off condition, in which it is possible to open the rear door 16 using the inside door opening handle 19. In both the on and off conditions the rear door 16 can be opened from outside the vehicle 10 providing an associated door latch is unlocked.

The first power actuator 20 lowers (opens) and raises (closes) the rear electric window 18, the first power actuator 20 being operable by a rear electric window switch 22 and a front mounted electric window switch 28. The front mounted electric window switch 28 can operate the first power actuator 20 to lower and raise the rear electric window.

Switch 12 is connected such that it affects the operation of the first and second power actuators as follows. The switch 12 is arranged such that it can achieve two positions. With the switch 12 in a first position, the second power actuator 26 acts to put the child safety locking device 24 of the rear door 16 into an off condition, and at the same time the switch 12 allows the rear electric window 18 of the rear door 16 to be raised and lowered by the rear electric window switch 22. This option will be referred to as the adult option.

With the switch 12 in a second position the second power actuator 26 acts to put the child safety locking device 24 of the rear door 16 into an on condition, and at the same time the switch 12 affects the rear electric window switch 22 such that the rear electric window 18 of the rear door 16 can be raised, but cannot be lowered by the rear electric window switch 22. With the switch 12 in the second position, an associated driver has selected an option, which will be referred to as child option A, in which the rear door 16 cannot be opened using the door opening handle 19, and the rear electric window switch 22 only raises the rear electric window 18.

Alternatively, the switch 12 is arranged such that it can achieve two positions, the second position allowing for child option B. The first position corresponds to the adult option described above in which the second actuator 26 acts to put the child safety locking device 24 of the rear door 16 into an off condition, and the switch 12 enables the rear electric window 18 of the rear door 16 to be raised and lowered by a rear electric window switch 22.

With the switch 12 in a second position the second actuator 26 acts to put the child safety locking device 24 of the rear door 16 into an on condition, and the switch 12 isolates the rear electric window switch 22 from the first power actuator 20 such that the rear electric window 18 cannot be raised or lowered by the rear electric window switch 22. With the switch 12 in the second position, an associated driver has selected an option, which will be referred to as child option B, in which the rear door 16 cannot be opened from the inside by handle 19, and the rear electric window 18 cannot be operated by the rear electric window switch 22.

It should be noted that child option B differs from child option A, in that child option B permits the rear electric window 18 to be set in a part-lowered state to allow for suitable ventilation. The rear electric window 18 can be set in the part-lowered state either by operation of the front mounted electric window switch 28, or, when the adult option is selected, by operation of the rear electric window switch 18. With child option B selected, the associated driver knows the rear electric window 18 cannot be lowered or raised by the rear electric window switch 22, and hence a suitable level of ventilation will be maintained.

Alternatively, the switch 12 is arranged such that it can achieve two positions, the second position allowing for child option C. The first position again corresponds to the adult option in which the second power actuator 26 acts to put the child safety locking device 24 of the rear door 16 into an off condition, and the switch 12 enables the rear electric window 18 of the rear door 16 to be raised and lowered by a rear window switch 22.

With the switch 12 in the second position, the second power actuator 26 acts to put the child safety locking device 24 of the rear door 16 into an on condition, and the switch 12 operates the first actuator 20 to close the rear electric window 18 of the rear door 16, and also to isolate the rear electric window switch 22 from the first actuator 20. With the switch 12 in the second position, an associated driver has selected an option, which will be referred to as child option C, in which the driver knows that the rear electric window 18 is fully raised, the rear door 16 cannot be opened from the inside by handle 19, and the rear electric window 18 cannot be operated by the rear electric window switch 22. This gives a higher degree in safety than child options A and B and could be described as 'full safety on.' It should be noted that the operation of the switch from the first to the second position simultaneously operated the first and second power actuators to achieve the option required.

It should be noted that the rear electric window may be operated by the front switch 28, or another switch (not shown) located at a position such that the rear seat occupant does not have access to said switch. A switch 12 is used to control the actuators of a single door, for example a rear right hand side door. A further separate switch could also be incorporated to control the actuators of a further door, such as a rear left hand side door. A single switch could be used to control in a similar manner, the power actuators of a plurality of doors, such as a rear left hand side door and a rear right hand side door.

Figure 2:
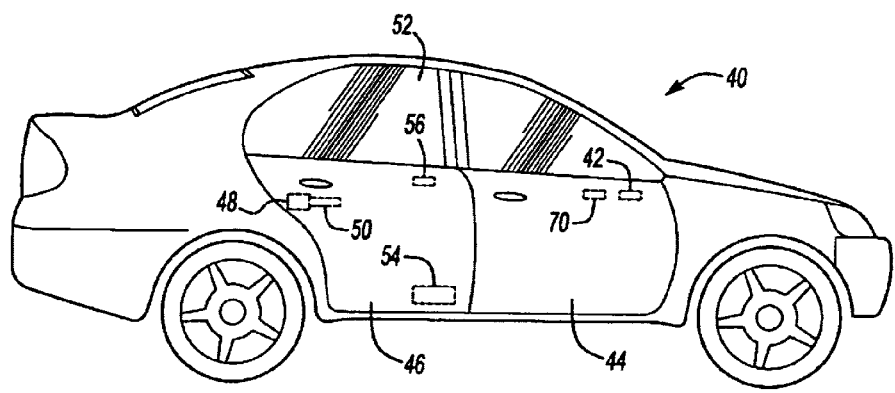
FIG. 2 is a right side view of a vehicle according to a second embodiment of the present invention.
Figure 3:
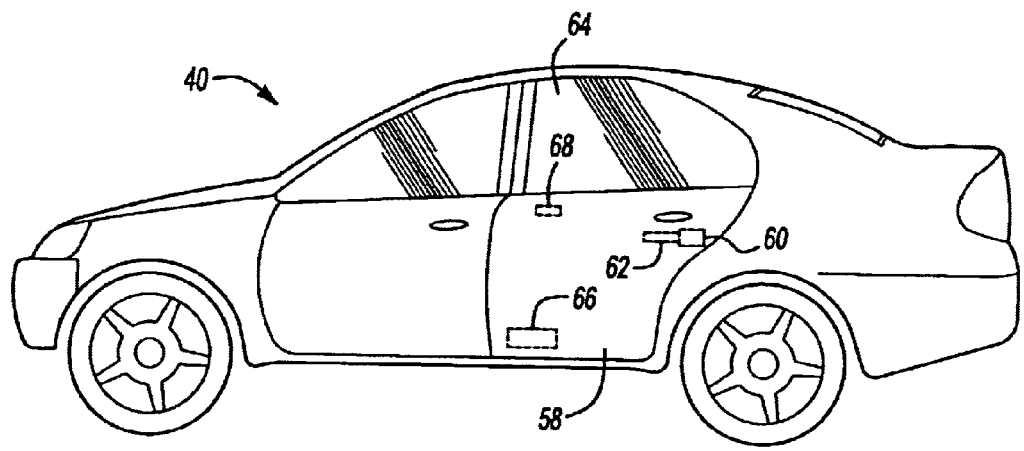
FIG. 3 is left side view of a vehicle according to a second embodiment of the present invention and FIG. 4 is an exploded view of a switch according to a second embodiment of the present invention.
Figure 4:
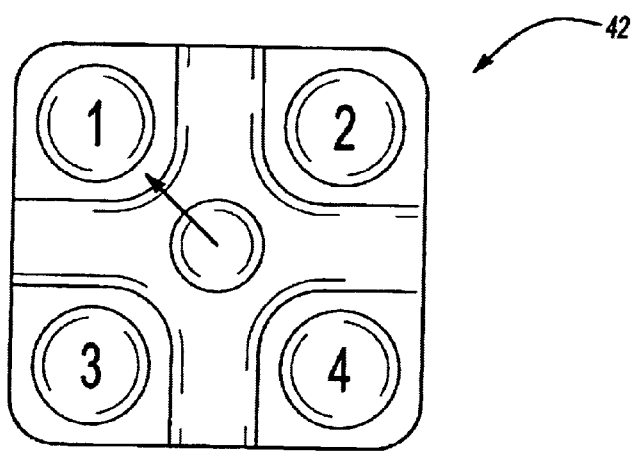

FIG. 2 and FIG. 3 show a vehicle 40 comprising a switch 42, a front drivers door 44, a right hand side rear door 46, a left hand side rear door 58, a right hand side rear electric window 52, a left hand side rear electric window 64, a right hand side rear door child safety locking device 48, and a left hand side rear door child safety locking device 60. The switch 42 is located on the front drivers door 44.

The right hand side rear door child safety locking device 48 is activated by a right hand side second power actuator 50. The left hand side rear door child safety locking device 60 is activated by a left hand side second power actuator 62. The right hand side rear electric window 52 is lowered and raised by a right hand side first power actuator 54, the right hand side first power actuator 54 being operable by a right hand side rear electric window switch 56. The left hand side rear electric window 64 is lowered and raised by a left hand side first power actuator 66, the left hand side first power actuator 66 being operable by a left hand side rear electric window switch 68.

The vehicle 40 further includes a front mounted electric window switch 70 which also operates the right hand side right hand side first power actuator 54 and the left hand side first power actuator 66. The right hand side second power actuator 50 acts to put the right hand side door rear child safety locking device 48 into an on or off condition. The left hand side second actuator 62 acts to put the left hand side rear door child safety locking device 60 into an on or off condition.

The operation of the switch 42 is as follows. The switch 42 is arranged such that it can achieve four positions, the four positions allowing either a given child option and the adult option to be applied independently to the right hand side rear door 46 and to the left hand side rear door 58.

With the switch 42 in first position the right hand side rear door child safety locking device 48 and the left hand side rear child safety locking device 60 are in the off condition, and the right hand side rear electric window 52 and the left hand side rear electric window 64 can be raised and lowered by the right hand side rear electric window switch 56 and the left hand side rear electric window switch 68 respectively. This corresponds to the adult option being selected for both the right hand side rear door 46 and the left hand side rear door 58.

With the switch 42 in the second position the right hand side second power actuator 50 acts to put the right hand side rear door child safety locking device 48 of the right hand side rear door 46 into an on condition, and the switch 42 affects the right hand side rear electric window switch 56 such that the right hand side rear electric window 52 can be raised but not lowered by the right hand side rear electric window switch 56. With the switch 42 in the second position, the left hand side second power actuator 62 acts to put the left hand side rear door child safety device 60 of the left hand side rear door 58 into an off condition, and the switch 42 affects the left hand side rear electric window switch 68 such that the second rear electric window 52 can be raised and lowered by the second rear electric window switch 68. This corresponds to child option A being selected for the right hand side rear door 46 and the adult option being selected for the left hand side rear door 58.

With the switch 42 in the third position the right hand side second power actuator 50 acts to put the right hand side rear door child safety locking device 48 of the right hand side rear door 46 into an off condition, and the switch 42 affects the right hand side rear electric window switch 56 such that the right hand side rear electric window 52 can be raised and lowered by the right hand side rear electric window switch 56. With the switch 42 in the third position the left hand side second power actuator 62 acts to put the left hand side rear door child safety device 60 of the left hand side rear door 58 into an on condition, and the switch 42 affects the left hand side rear electric window switch 68 such that the left hand side rear electric window 64 can be raised by the left hand side rear electric window switch 68. This corresponds to adult option being selected for the right hand side rear door 46 and child option A being selected for the left hand side rear door 58.

With the switch 42 in the fourth position the right hand side second power actuator 50 acts to put the right hand side rear door child safety locking device 48 of the right hand side rear door 46 into an on condition, and the switch 42 affects the right hand side rear electric window switch 56 such that the right hand side rear electric window 52 can be raised but not lowered by the right hand side rear electric window switch 56. With the switch 42 in the third position the left hand side second power actuator 62 acts to put the left hand side rear door child safety device 60 of the left hand side rear door 58 into an on condition, and the switch 42 affects the left hand side rear electric window switch 68 such that the left hand side rear electric window 64 can be raised but not lowered by the left hand side rear electric window switch 68. This corresponds to child option A being selected for both the right hand side rear door 46 and the left hand side rear door 58.

A summary of the switch positions is given in Table 1.

TABLE 1

| | Switch Position | | | |
|---|---|---|---|---|
| | 1 | 2 | 3 | 4 |
| Right hand side rear door | AD | CA | AD | CA |
| Left hand side rear door | AD | AD | CA | CA |

Switch Position and Corresponding Option

Where AD refers to the adult option and CA refers to child option A.

The switch 42 can be arranged such that child option A is substituted by either child option B, or child option C.

Note that the right hand side rear door could have only the adult option and child option A available to it, whilst the left hand rear side door could have only the adult option and child option B available to it, or even limited to child option A or B, with no adult option available. This combination of options could apply to a situation in which the driver requires only child safety options on a door opening onto traffic, for example, the right hand side rear door on a vehicle destined for a country which drives on the left hand side of the road, e.g. the United Kingdom.

This combination could also be particularly applicable in a vehicle including two rear side doors, and a rear facing door such as a tailgate or hatchback type door in which passengers can gain access to the vehicle. It would be possible to select either the child or adult options for the rear side doors and rear facing door.

Alternatively, the switch 42 is arranged so as to interact with only a single first rear door such that it can achieve four positions, the first position enabling the adult option in the first rear door, the second position enabling child option A in the first rear door, the third position enabling child option B in the first rear door, and the fourth position enabling child option C in the first rear door. A second identical switch could be introduced to operate in the same manner in relation to the second rear door.

The switches could be situated within easy reach of the driver, for example on a dashboard, or on a center console of a vehicle.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A control system for a vehicle door having a window operable by a window operating switch, a child safety locking device, and a door opening handle, the control system comprising:

a first power actuator that controls the window;

a second power actuator that operates the child safety locking device, wherein the child safety locking device prevents a vehicle door from opening in response to operation of the door opening handle during a child safety on condition;

a control switch operably coupled to the first power actuator and the second power actuator, wherein actuation of the control switch inhibits the first power actuator from opening the window in response to operation of the window operating switch and operates the second power actuator to place the child safety locking device into the child safety on condition.

2. A control system according to claim 1, wherein operation of the control switch simultaneously operates the second power actuator to put the child safety locking device into a child safety on condition, and inhibits the first power actuator from opening the window in response to operation of the associated window operating switch.

3. A control system according to claim 1, wherein the control switch further operates the second power actuator to put to child safety locking device into a child safety off condition.

4. A control system according to claim 1, wherein the control switch isolates the first actuator from the associated window operating switch.

5. A control system according to claim 1, wherein the control switch operates the first actuator to close the window.

6. A control system according to claim 1, wherein the control switch allows the window to be closed but not opened by operation of the window operating switch.

7. A control system according to claim 1, wherein the control switch prevents the window from being closed or opened by operation of the window operating switch.

8. A control system according to claim 1, wherein the control switch allows the window to close and prevents the window from being re-opened by operation of the associated window operating switch.

9. A control system to claim 1, wherein the control switch is located proximate a driver of the vehicle.

10. A control system for a vehicle having a plurality of windows, each window being operable by a corresponding window operating switch, at least one child safety locking device, and at least one door operating handle, the control system comprising:

a plurality of first power actuators, each first power actuator associated with one of said plurality of windows; at least one second power actuator that activates said at least one child safety locking device, wherein the child safety locking device prevents a vehicle door from opening in response to operation of the door operating handle during a child safety on condition; and a control switch operably coupled to the plurality of first power actuators and said at least one second power actuator, wherein actuation of the control switch inhibits at least two of said first power actuators from operating in response to operation of the corresponding window operating switch and actuates at least one second power actuator to place at least one child safety locking device into the child safety on condition.

11. The control system according to claim 10, wherein the control switch is movable between a first position, a second position, a third position, and a fourth position, wherein the first position operates the plurality of windows, the second position operates a first one of the plurality of windows, the third position operates a second one of the windows, and the fourth position operates both the first and second ones of the windows.

12. A control system for a vehicle having at least one window, each window being operable by a corresponding window operating switch, a plurality of child safety locking devices, and at least one door operating handle, the control system comprising:

at least one first power actuator that actuates at least one of said plurality of windows;

a plurality of second power actuators, wherein each second power actuator activates one of said child safety locking devices, wherein the child safety locking device prevents a vehicle door from opening in response to operation of the door operating handle during a child safety on condition; and a control switch operably coupled to said at least one first power actuator and the plurality of second power actuators, wherein actuation of the control switch inhibits at least one first power actuator from operating in response to operation of the corresponding window operating switch and actuates at least two of the second power actuators to place at least two child safety locking devices into the child safety on position.

13. A control system according to claim 12, wherein the control switch inhibits operation of at least two first power actuators in the same vehicle doors as said at least two actuated second power actuators.

14. A control system according to claim 12 wherein the control switch is operable between a first position, a second position, a third position, and a fourth position, wherein the first position opens the vehicle doors, the second position puts a first child safety locking device into the child safety on condition, the third position puts a second child safety locking device into the child safety on condition, and a fourth position puts both the first and second child safety locking device into the child safety on condition.

* * * * *

UNITED STATES PATENT AND TRADEMARK OFFICE
CERTIFICATE OF CORRECTION

PATENT NO.   : 6,650,025 B2
DATED         : November 18, 2003
INVENTOR(S)  : Li

It is certified that error appears in the above-identified patent and that said Letters Patent is hereby corrected as shown below:

<u>Column 6,</u>
Line 54, please insert -- according -- after "system" and before "to"

Signed and Sealed this

Ninth Day of March, 2004

JON W. DUDAS
*Acting Director of the United States Patent and Trademark Office*